US008938089B1

(12) United States Patent
Postelnicu et al.

(10) Patent No.: US 8,938,089 B1
(45) Date of Patent: Jan. 20, 2015

(54) DETECTION OF INACTIVE BROADCASTS DURING LIVE STREAM INGESTION

(75) Inventors: Gheorghe Postelnicu, Zurich (CH); Matthew Sharifi, Zurich (CH)

(73) Assignee: Google Inc., Mountain View, CA (US)

( * ) Notice: Subject to any disclaimer, the term of this patent is extended or adjusted under 35 U.S.C. 154(b) by 385 days.

(21) Appl. No.: 13/533,818

(22) Filed: Jun. 26, 2012

(51) Int. Cl.
*G06K 9/00* (2006.01)

(52) U.S. Cl.
USPC ............................................ 382/100

(58) Field of Classification Search
None
See application file for complete search history.

(56) References Cited

U.S. PATENT DOCUMENTS

| | | | | |
|---|---|---|---|---|
| 4,682,246 | A * | 7/1987 | Efron et al. | 386/263 |
| 6,628,737 | B1 * | 9/2003 | Timus | 375/368 |
| 7,328,153 | B2 * | 2/2008 | Wells et al. | 704/231 |
| 7,991,198 | B2 * | 8/2011 | Zhao et al. | 382/112 |
| 2003/0156733 | A1 * | 8/2003 | Zeller et al. | 382/100 |
| 2005/0102397 | A1 * | 5/2005 | Tsuyama et al. | 709/225 |
| 2006/0286489 | A1 * | 12/2006 | Duffield et al. | 430/380 |
| 2011/0129116 | A1 * | 6/2011 | Thorwirth | 382/100 |
| 2011/0222787 | A1 * | 9/2011 | Thiemert et al. | 382/225 |
| 2011/0261257 | A1 * | 10/2011 | Terry et al. | 348/515 |

OTHER PUBLICATIONS

Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.

Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.

Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.

\* cited by examiner

*Primary Examiner* — Nancy Bitar
(74) *Attorney, Agent, or Firm* — Amin, Turocy & Watson, LLP

(57) ABSTRACT

Systems and methods are provided herein relating to real-time detection of inactive broadcasts during live stream ingestion. Both audio fingerprints and video fingerprints can be dynamically and continuously generated for a live stream ingestion. Sets of video fingerprints and sets of audio fingerprints can be continuously generated based on common successive overlapping time windows. A set of audio fingerprints and a set of video fingerprints can be associated with each time window. Video similarity scores and audio similarity scores can be generates for each time window to determine whether the stream is inactive or static during the time window. Only fingerprints relating to an active broadcast can be indexed in a fingerprint index.

19 Claims, 9 Drawing Sheets

US 8,938,089 B1

DETECTION OF INACTIVE BROADCASTS DURING LIVE STREAM INGESTION

TECHNICAL FIELD

This application relates to media classification and more particularly to detection of inactive broadcasts during live stream ingestion.

BACKGROUND

Media sharing services have become prolific on the internet as connection speeds have increased giving consumers the ability to upload, for example, their own personal videos. Most media sharing services act strictly as an intermediary, for example, they give the user a forum to display the user's version of a video. The media sharing service can then host the user uploaded media allowing other users on the internet the ability to view the uploaded media.

Media sharing services are also capable of streaming media from a live event. For example, a media sharing service could host a live sporting event capable of being displayed to users of the media sharing service. When a media sharing service ingests a stream from a live event, it is desirable that the stream be immediately protected from other users of the media sharing service uploading the same content at the same time. Thus, streams ingested from a live event can be dynamically indexed in a reference index that can be matched against other content, such as user uploaded content.

When performing stream ingestion of complex live events, a number of non-stop feeds of audio and visual content can be ingested in parallel. While broadcasting is not taking place, i.e., during a break in the action, the feeds can still contain a valid signal, such as a still image. Indexing and matching against a signal that is an inactive broadcast can add to storage and computational costs associated with a content matching system. Therefore, it is desirable that portions of live stream ingestions that are inactive broadcasts are not indexed and/or matched against other content.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to video classification. A receiving component can receive a stream ingestion of a live event. A video fingerprint component can dynamically and continuously generates video fingerprints of the stream ingestion based on a video sample period. An audio fingerprint component can dynamically and continuously generate audio fingerprints of the stream ingestion based on an audio sample period. A packing component can dynamically and continuously generate sets of video fingerprints and sets of audio fingerprints based on common successive overlapping time windows, wherein a set of video fingerprints and a set of audio fingerprints are associated with each time window. A video static evaluation component can determine a set of video similarity scores for respective sets of video fingerprints among the sets of video fingerprints. An audio static evaluation component can determine a set of audio similarity scores for respective sets of audio fingerprints among the sets of audio fingerprints. Systems and methods disclosed herein further provide for removing video fingerprints and audio fingerprints related to static from a reference index.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
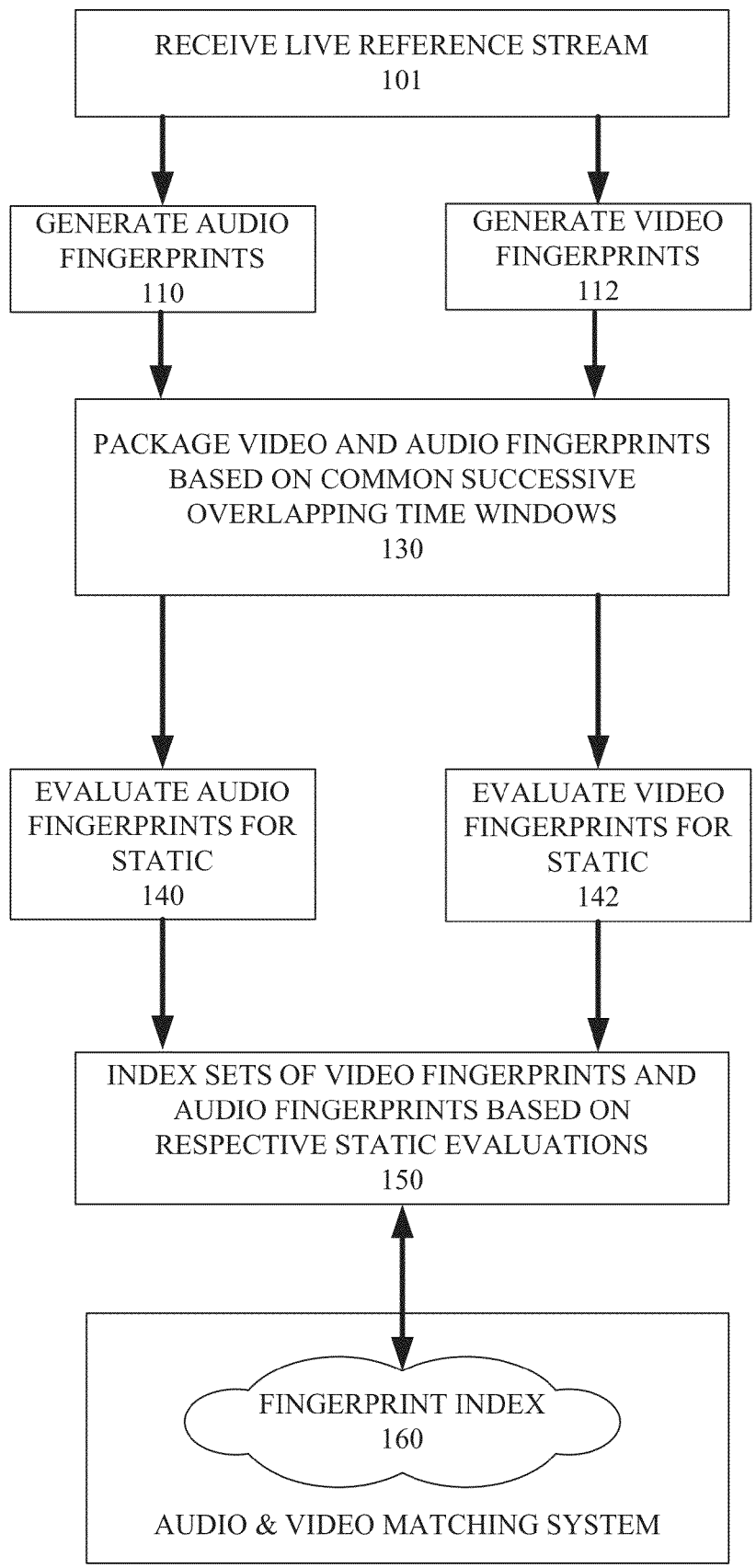
FIG. 1 illustrates an example flow diagram for detecting inactive broadcasts during stream ingestion and updating a fingerprint index in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

It is to be appreciated that in accordance with one or more implementations described in this disclosure, users can optout of providing personal information, demographic information, location information, proprietary information, sensitive information, or the like in connection with data gathering aspects. Moreover, one or more implementations described herein can provide for anonymizing collected, received, or transmitted data.

Media sharing services are capable of streaming media from a live event. For example, a media sharing service could host a live sporting event capable of being displayed to users of the media sharing service. Media sharing services can also be capable of preventing users of their services from uploading live streams related to events the media sharing service is not hosting. Therefore, when a media sharing service ingests a stream from a live event, it is desirable that the stream be immediately protected from other users of the media sharing service uploading the same content at the same time. Thus, streams ingested from a live event can be dynamically indexed in a reference index that can be matched against other content, such as user uploaded content.

In general, identifying duplicates or near duplicates of media content is accomplished using both video and audio fingerprinting in identifying potential matches. Video fingerprints and audio fingerprints related to user uploaded media can be compared to video and audio fingerprints of the live event to determine if the user uploaded media content is a match.

For example, in video fingerprinting, unique features of the video, also known as interest points, can be extracted and stored as a video fingerprint where the video fingerprint is a function of a set of interest points. Interest points can be based on extracted features such as a histogram of local features, a color histogram, edge features, a histogram of textons, face features, camera motion, shot boundary features, audio features, etc. Video fingerprints are generally much smaller than the actual video files themselves and can be designed to preserve similarity. Thus, comparing the video fingerprint of an uploaded video to video fingerprints associated with the live event can determine a potential match.

Similar to video fingerprinting, in audio fingerprinting, unique features of an audio track, also known as interest points, can be extracted and stored as an audio fingerprint where the audio fingerprint is a function of a set of interest points. Interest points within an audio track can include unique spectral events, such as a spectral peak at a point in time or the onset of a spectral peak at a point in time. One type of audio fingerprint can be a melody fingerprint that includes interest points related to the melody of the audio track rather than to speech or other unique spectral events. Melody fingerprints can be used to identify an audio sample that includes common melody features however with other different audio features overlaying the melody. For example, a live broadcast of a sporting event may have common melodies related to the actual sporting event; however, include speech of differing languages overlaying the common melody. A melody audio fingerprint can assist in matching the common melody while ignoring other differing audio characteristics. Audio fingerprints are generally much smaller than the actual audio files themselves. Thus, comparing the audio fingerprint of an uploaded video to audio fingerprints associated with the live event can further assist in determining a potential match.

When performing stream ingestion of complex live events, a number of non-stop feeds of audio and visual content can be ingested in parallel. While broadcasting is not taking place, i.e., during a break in the action, the feeds can still contain a valid signal, such as a still image. Indexing audio fingerprints and video fingerprints from a valid signal that is an inactive broadcast can add to both storage costs in storing fingerprints related to the inactive broadcast as well as add to computational costs associated with a content matching system that determines whether content, such as user uploaded content, matches indexed video fingerprints or audio fingerprints. Additionally, if content related to static or inactivity is added to a fingerprint index and used to match against user uploaded content, user uploaded content containing periods of static or inactivity may be deemed a match under matching algorithms. Matching to static or inactivity is likely to be a false positive. Therefore, it is desirable that audio fingerprints and video fingerprints of live stream ingestions that relate to an inactive broadcast not be indexed and/or matched against other content.

Referring now to FIG. 1 there is illustrated an example flow diagram for detecting inactive broadcasts during stream ingestion and updating a fingerprint index. At 101, a live reference stream can be received and can be ingested. For example, a live reference stream can include encoded audio, encoded video, metadata, indexing data, etc. In parallel at 110 and 112, both audio fingerprints and video fingerprints can be generated. At 130, video and audio fingerprints can be packaged based on common successive overlapping time windows as more fully described with respect to FIG. 2 below. In parallel, at 140 and 142, both audio fingerprints and video fingerprints can be evaluated for static as more fully described with respect to FIG. 2 below. At 150, sets of video fingerprints and audio fingerprints can be indexed based on the respective static evaluations. For example, those fingerprints which are deemed to reflect static or inactive broadcasts will not be indexed. Thus, fingerprint index 160, used within an audio and video matching system, will only contain audio and video fingerprints relating to those portions of the live reference stream that are active broadcasts.

Figure 2A:
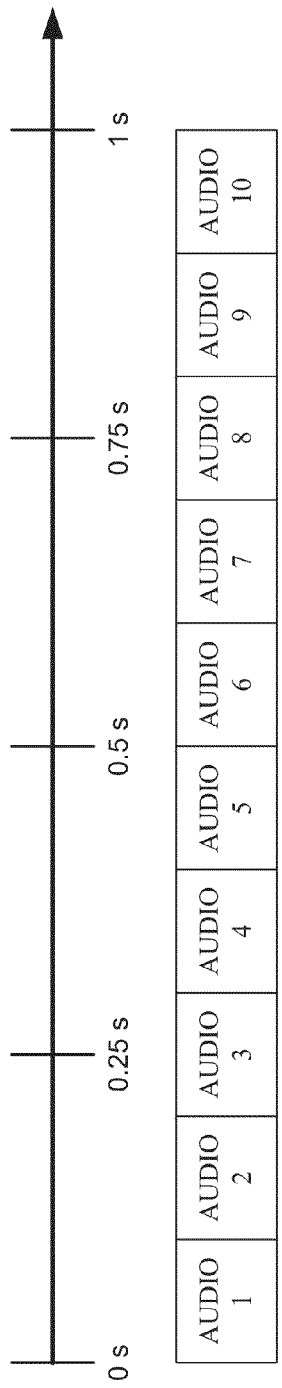
FIG. 2A illustrates example sampling periods for audio fingerprints and video fingerprints based on a common time window in accordance with implementations of this disclosure.

FIG. 2A illustrates example sampling periods for audio fingerprints and video fingerprints based on a common time window in accordance with implementations of this disclosure. The common timeline illustrated starts at zero seconds on the left and ends at one second on the right. In this example, four video fingerprints (video 1 through video 4) are generated during the one second sampling period. In the same one second sampling period, ten audio fingerprints (audio 1 through audio 10) are generated. It can be appreciated that each fingerprint, both audio and video, represent a snapshot of that content at a particular point in time. Although inactive or static broadcasts can equally impact both audio and video features relating to a video stream, there can be instances where either audio fingerprints or video fingerprints are not static while the other features are. For example, music can be playing in the background while a static video feed states a message that the broadcast is inactive. Audio fingerprints relating to the music may not be static; however video fingerprints relating to the static video feed may well be. Therefore, in some implementations, when either video fingerprinting or audio fingerprints indicate that the stream is inactive, both video fingerprints and audio fingerprints associated with the broadcast during the inactivity period are recognized. It can be appreciated that in other implementations both audio fingerprints and video fingerprints must indicate the stream is inactive for the inactivity period to be recognized. It can be further appreciated that melody fingerprints, for example, generated for the same time period can be deemed as related to static or inactivity when non-melody audio fingerprints and video fingerprints relating to the same time period are indicative of static or inactivity.

In one implementation, sets of video fingerprints and audio fingerprints can be packed based on a common time period. Thus, when one set of fingerprints for that time period are deemed related to an inactive broadcast, the other set of fingerprints for the same time period can also be deemed related to an inactive broadcast. For example, for the common time period of one second, as shown in FIG. 2A, the four video fingerprints can be packed into a set of video fingerprints and the ten audio fingerprints can be packed into a set of audio fingerprints. This can allow both audio fingerprints and video fingerprints in the respective sets to be analyzed independently for static or inactivity, and the independent results can be associated with each other. It can be appreciated that varying sample rates can be used for both audio fingerprinting and video fingerprinting and need not be the ten samples per second for audio and four samples per second for video as shown.

Figure 2B:
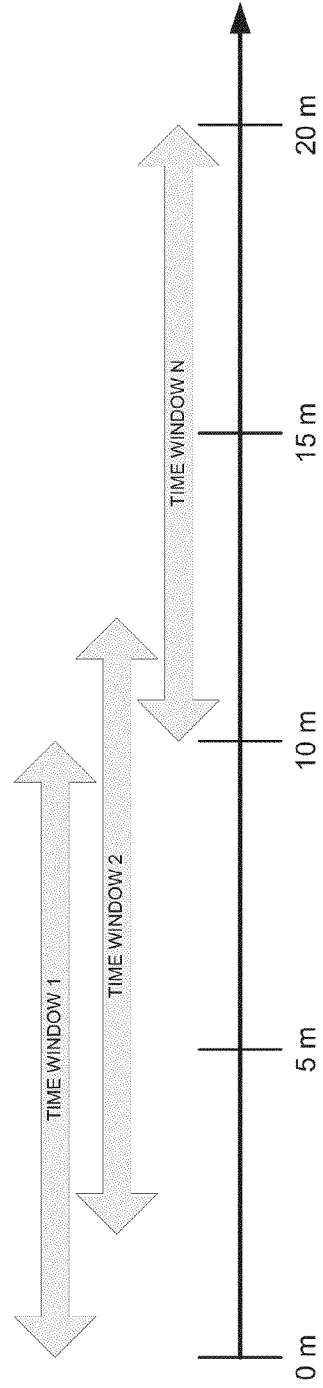
FIG. 2B illustrates example common successive overlapping time windows in accordance with implementations of this disclosure.

FIG. 2B illustrates example common successive overlapping time windows in accordance with implementations of this disclosure. Fingerprints will be generated in real time due to continuous processing of the stream ingestion. A sliding common successive overlapping time window (e.g., time window 1) can be used to analyze the video for inactivity or static. Time window 1 is the time window from zero minutes to ten minutes. Time window 2, as shown, is the time window from two and a half minutes to twelve and a half minutes. Time window N, where "N" is an integer, as shown, is the time window from ten minutes to twenty minutes. It can be appreciated that the time windows can have the same common length, can be successive, and can be overlapping. In one implementation, each additional fingerprint sample period, e.g., one second as shown in FIG. 2A, starts a new time window. In that example, the first time window would run from zero minutes to ten minutes, the second time window would run from zero minutes and one second to ten minutes and one second, the third time window would run from zero minutes and two seconds to ten minutes and two seconds, etc. It can be appreciated that both the sample period and the time window are adjustable and can be chosen to maximize efficiency of the disclosed systems and methods.

In an example, if the time window is ten minutes, for each ten minute window of the video, sets of video fingerprints and sets of audio fingerprints within the window can be analyzed for static or inactivity. For example, a Hamming similarity can be generated for all pairs of fingerprints within the window. If every pair of fingerprints has a similarity which is above a normalized threshold, e.g., 0.5, then the window can be deemed as static or inactive. The Hamming similarity test can be used for both audio fingerprints and video fingerprints, separately, within the time window. If either or both are detected as static or inactive, then the fingerprints related to the time window can be removed from a fingerprint index. The static evaluation of the common successive overlapping time windows will by default be performed for every new sample period that is observed, based on the length of the time window (e.g., ten minutes). Because of the high overlap between time windows, the static evaluation test can be optimized by not recomputing every Hamming similarity for each window. For example, when new audio and video fingerprints are received for the latest sample period, the oldest fingerprints (e.g., those fingerprints from the oldest sample period) from the previous time window can be removed. The Hamming similarity can be computed strictly for the newest fingerprints and the set of comparisons to the remaining fingerprints in the current time window.

In one implementation, the audio static test can allow for detection of two distinct types of static. The first is a static tone which will be captured using the previously described Hamming similarities. The second is detection of near silence. For example, if the mean amplitude of the audio waveform is very low for each audio fingerprint in the time window, then it can be determined that it is near silent and indicative of static or inactivity.

Figure 3:
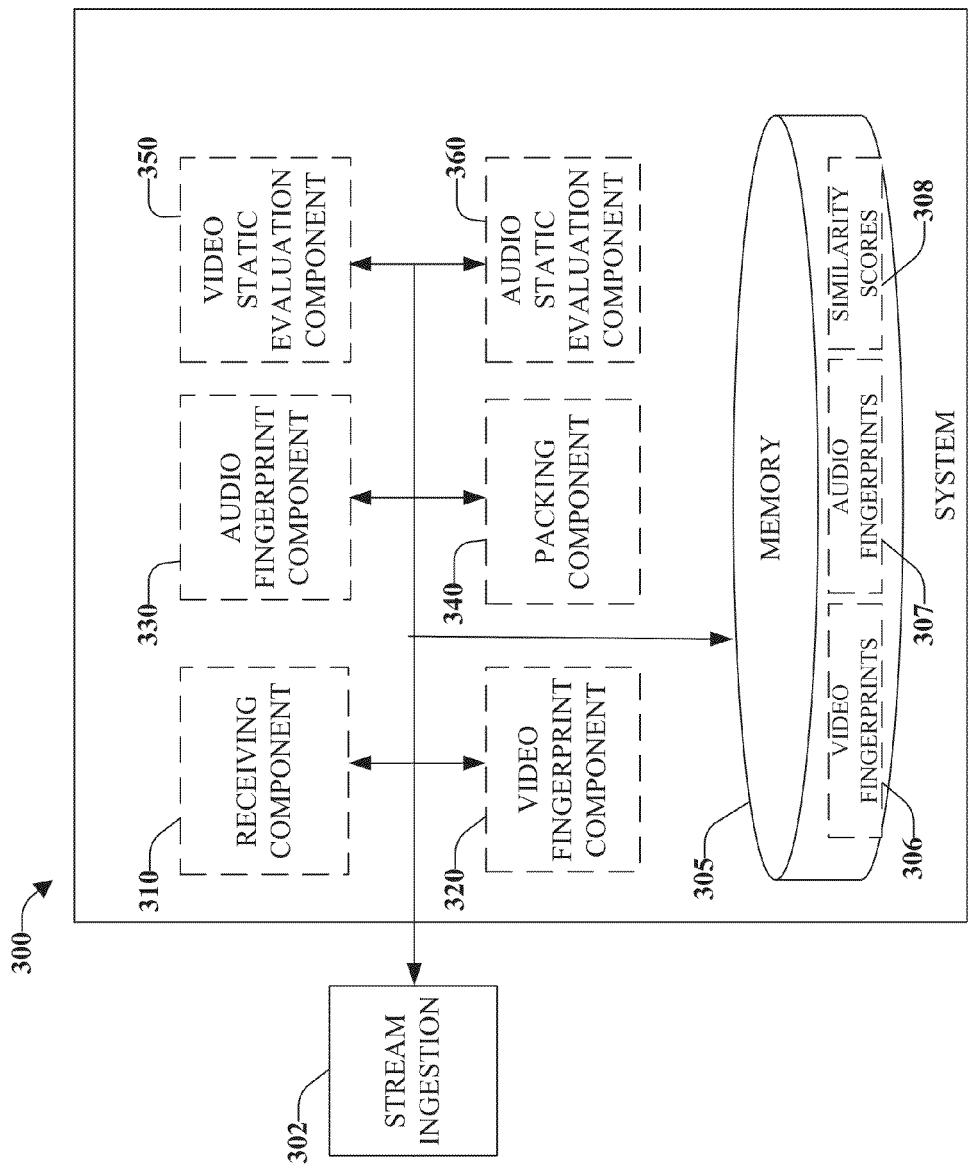
FIG. 3 illustrates an example high-level block diagram of an example system that detects inactive broadcasts during stream ingestion.

Referring now to FIG. 3, there is illustrated an example high-level block diagram of an example system that detects inactive broadcasts during stream ingestion. In FIG. 3, a system 300 includes a receiving component 310, a video fingerprint component 320, an audio fingerprint component 330, a packing component 340, a video static evaluation component 350, an audio static evaluation component 360, and a memory 305, each of which may be coupled as illustrated. A receiving component 310 can received stream ingestion 302. For example, stream ingestion 302 can include encoded audio, encoded video, metadata, indexing data, etc.

Video fingerprint component 320 can dynamically and continuously generate video fingerprints of the stream ingestion based on a video sample period. Audio fingerprint component 330 can dynamically and continuously generate audio fingerprints of the stream ingestion based on an audio sample period. In one implementation, the audio sample period and the video sample period are not equal.

Packing component 330 can dynamically and continuously generate sets of video fingerprints and sets of audio fingerprints based on common successive overlapping time windows, wherein a set of video fingerprints and a set of audio fingerprints are associated with each time window. In one implementation, successive overlapping time windows are the same length. It can be appreciated that sets of video fingerprints 306 can be stored within memory 305 for access by other components. It can be similarly appreciated that sets of audio fingerprints 307 can also be stored within memory 305 for access by other components.

Video static evaluation component 340 can determine a set of video similarity scores for respective sets of video fingerprints among the sets of video fingerprints. In one implementation, video static evaluation component 340 can determine the set of video similarity scores further based on Hamming similarities. In another implementation, video static evaluation component 340 can determine the set of video similarity scores further based on a preceding set of video similarity scores. For example, similarity scores related to the previous common successive overlapping time window can be used so that similarity scores between a subset of respective fingerprints need not be recalculated. It can be appreciated that sets of similarity scores 308 can be stored within memory 305 for access by other components.

Audio static evaluation component 350 can determine a set of audio similarity scores for respective sets of audio fingerprints among the sets of audio fingerprints. In one implementation, audio static evaluation component 350 can determine the set of audio similarity scores further based on Hamming similarities. In another implementation, audio static evaluation component 350 can determine the set of audio similarity scores further based on a preceding set of audio similarity scores. For example, similarity scores related to the previous common successive overlapping time window can be reused so that similarity scores between a subset of respective fingerprints need not be recalculated.

In yet another implementation, audio static evaluation component 350 can determine a set of audio similarity scores further based on mean amplitudes for respective audio fingerprints in the set of audio fingerprints.

Figure 4:
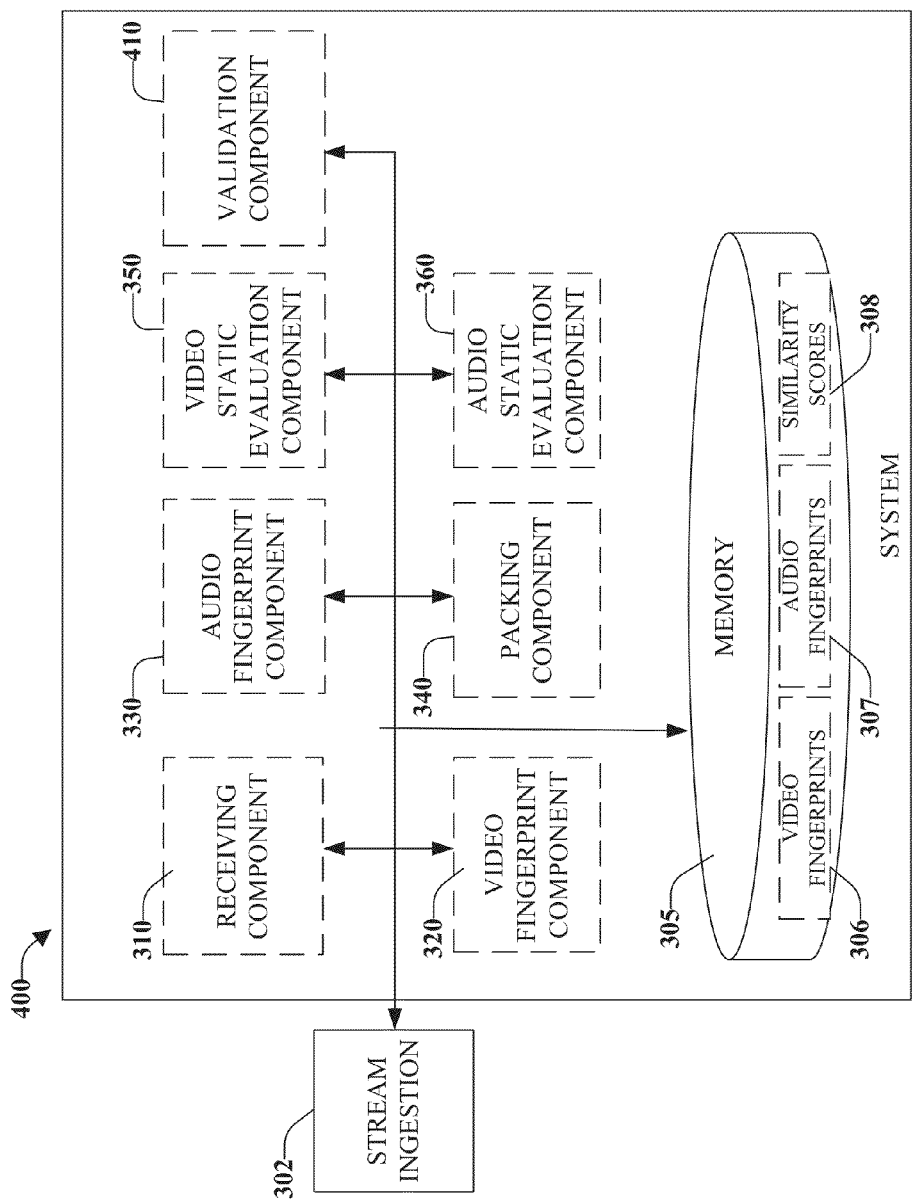
FIG. 4 illustrates an example high-level block diagram of an example system that detects inactive broadcasts during stream ingestion including a validation component in accordance with implementations of this disclosure.

Referring now to FIG. 4, there is illustrated an example high-level block diagram of an example system that detects inactive broadcasts during stream ingestion including a validation component in accordance with implementations of this disclosure. Validation component 410 can dynamically determine valid video fingerprints among the sets of video fingerprints and valid audio fingerprints among the sets of audio fingerprints based on the sets of video similarity scores and the sets of audio similarity scores. For example, time windows relating to an inactive broadcast can be determined based on the sets of similarity scores for both audio and video relating to the time window. Those fingerprints related to an inactive time window can be deemed invalid fingerprints. It can be appreciated that as successive time windows are analyzed, some fingerprints can be deemed invalid multiple times, as individual fingerprints are likely to be in multiple successive overlapping time windows. Those audio fingerprints and video fingerprints that are not deemed invalid after analysis of the audio similarity scores and video similarity scores associated with every time window in which the fingerprint resides in, can be determined to be valid audio fingerprints and valid video fingerprints respectively.

Figure 5:
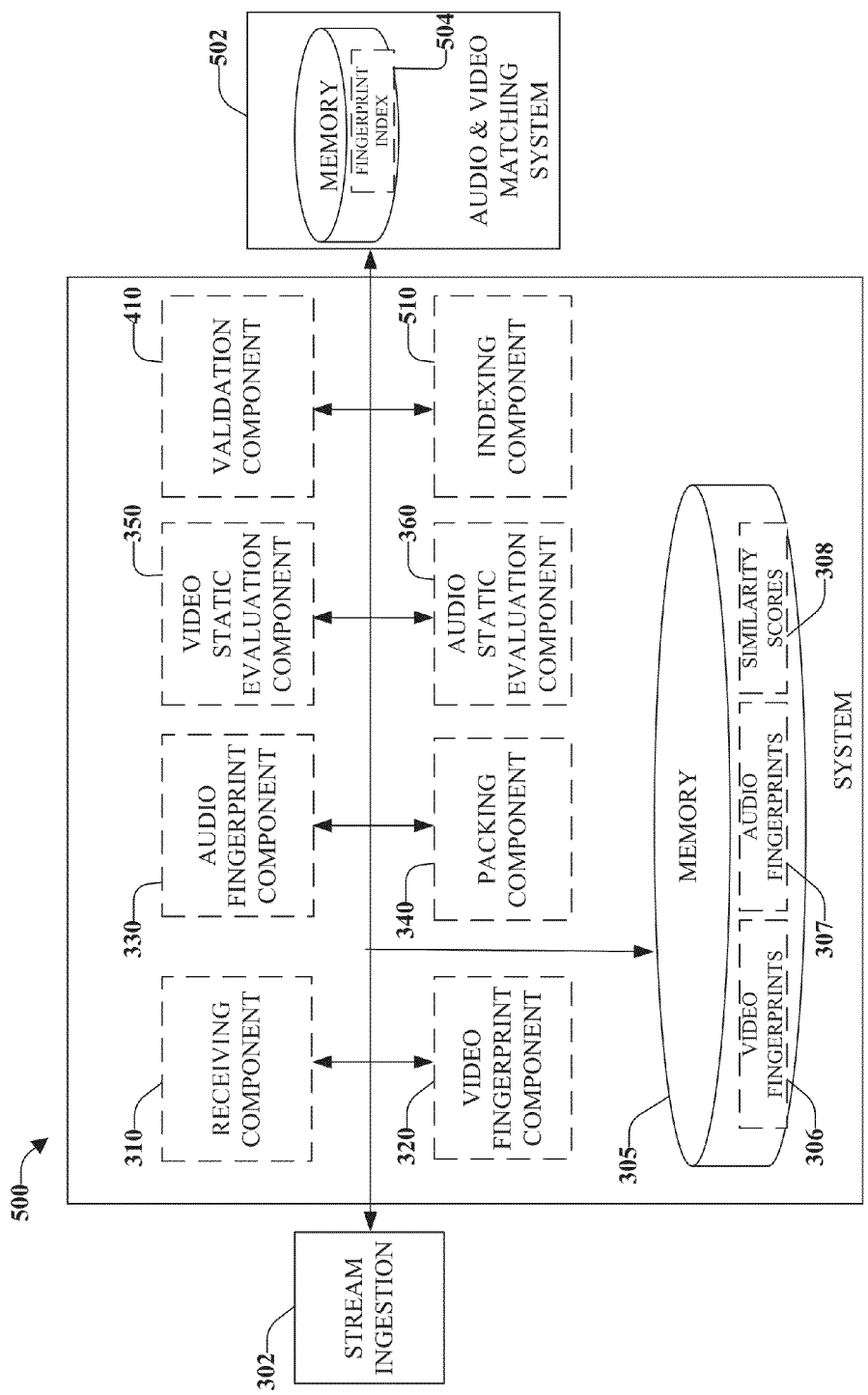
FIG. 5 illustrates an example high-level block diagram of an example system that detects inactive broadcasts during stream ingestion including an indexing component in accordance with implementations of this disclosure.

Referring now to FIG. 5, there is illustrated an example high-level block diagram of an example system that detects inactive broadcasts during stream ingestion including an indexing component in accordance with implementations of this disclosure. Indexing component 510 can add the valid video fingerprints among the sets of video fingerprints and the valid audio fingerprints among the sets of audio fingerprints to a fingerprint index 504. It can be appreciated that fingerprint index 504 can be stored within an audio and video matching system 502. Audio and video matching system 502 can utilize fingerprint index 504 in matching, for example, user uploaded content to stream ingestion 302, to prevent duplicate uploads of existing content and/or copyright protected content.

Figure 6:
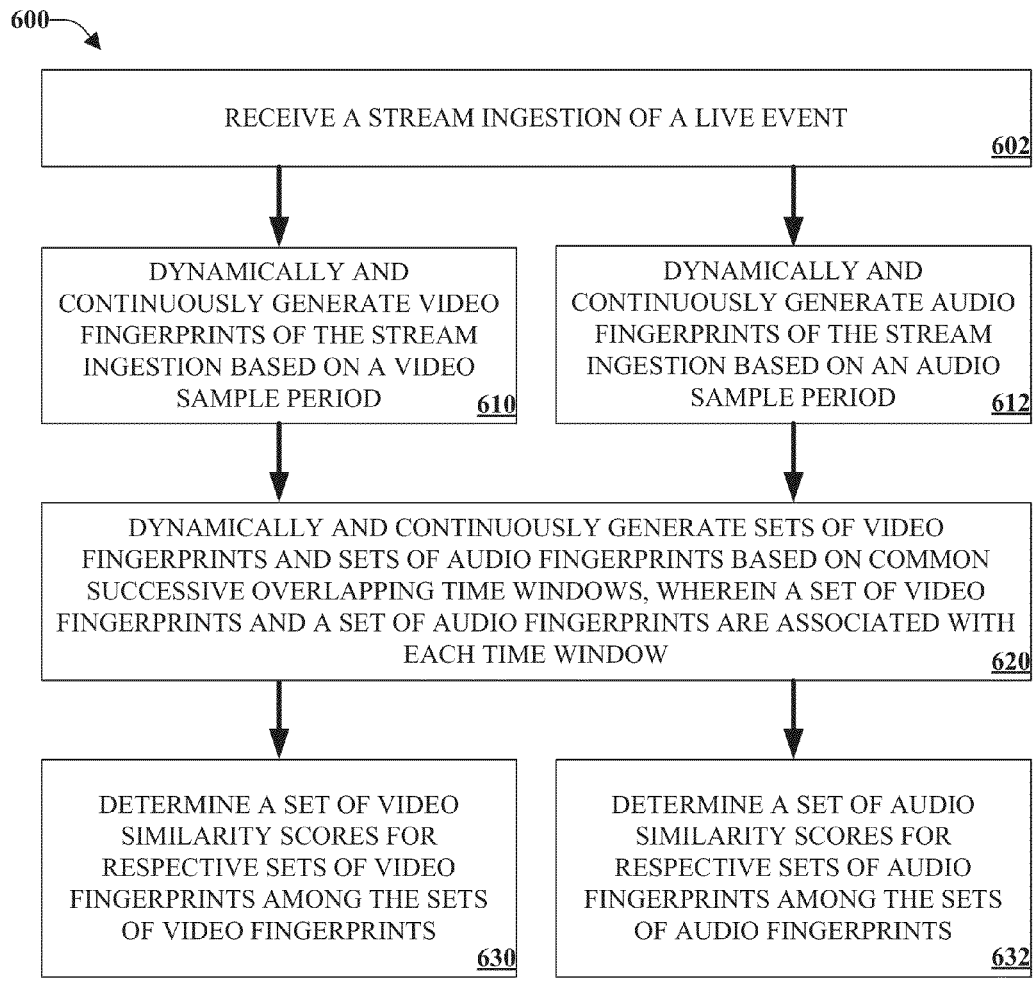
FIG. 6 illustrates an example flow diagram method for detecting inactive broadcasts during stream ingestion in accordance with implementations of this disclosure.
Figure 7:
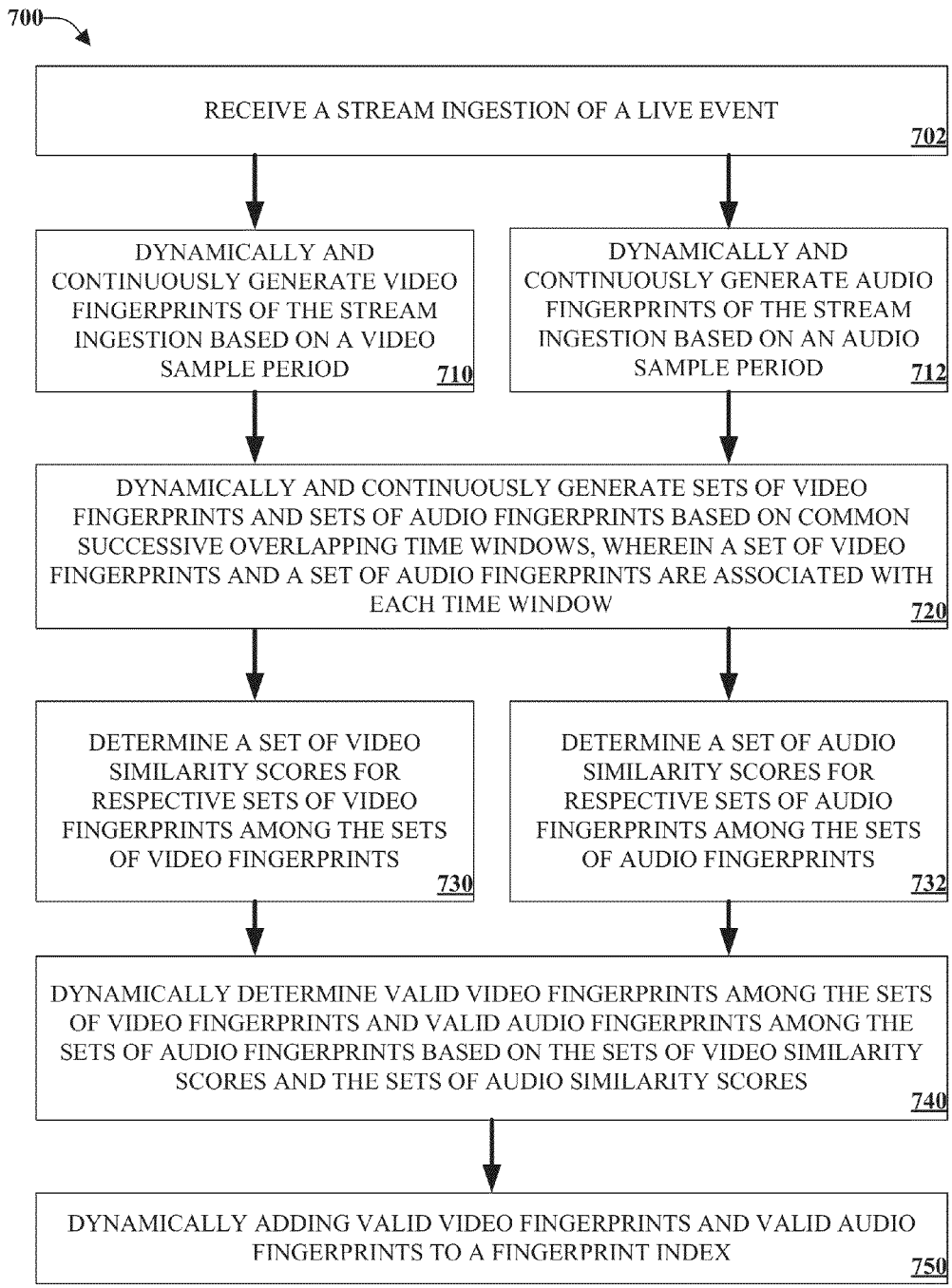
FIG. 7 illustrates an example flow diagram method for detecting inactive broadcasts during stream ingestion including updating a fingerprint reference index in accordance with implementations of this disclosure.

FIGS. 6-7 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methods.

Referring now to FIG. 6, there is illustrated an example flow diagram method for detecting inactive broadcasts during stream ingestion in accordance with implementations of this disclosure. At 602, a stream ingestion can be received (e.g., by a receiving component).

At 610, video fingerprints of the stream ingestion can be dynamically and continuously generated (e.g., by a video fingerprint component) based on a video sample period. Concurrently, at 612, audio fingerprints of the stream ingestion can be dynamically and continuously generated (e.g., by an audio fingerprint component) based on an audio sample period. In one implementation, the video sample period and the audio sample period are not equal.

At 620, sets of video fingerprints and sets of audio fingerprints can be dynamically and continuously generated (e.g., by a packing component) based on common successive overlapping time windows, wherein a set of video fingerprints and a set of audio fingerprints are associated with each time window. In one implementation, successive overlapping time windows are the same length.

At 630, a set of video similarity scores can be determined (e.g., by a video static evaluation component) for respective sets of video fingerprints among the sets of video fingerprints. In one implementation, determining the set of video similarity scores is further based on Hamming similarities. In another implementation, determining the set of video similarity scores is further based on a preceding set of video similarity scores. Concurrently, at 632, a set of audio similarity scores can be determined (e.g., by an audio static evaluation component) for respective sets of audio fingerprints among the sets of audio fingerprints. In one implementation, determining the set of audio similarity scores is further based on at least one of Hamming similarities or mean amplitudes. In another implementation, determining the set of audio similarity scores is further based on a preceding set of audio similarity scores.

Referring now to FIG. 7, there is illustrated an example flow diagram method for detecting inactive broadcasts during stream ingestion including updating a fingerprint reference index in accordance with implementations of this disclosure. At 702, a stream ingestion can be received (e.g., by a receiving component).

At 710, video fingerprints of the stream ingestion can be dynamically and continuously generated (e.g., by a video fingerprint component) based on a video sample period. Concurrently, at 712, audio fingerprints of the stream ingestion can be dynamically and continuously generated (e.g., by an audio fingerprint component) based on an audio sample period.

At 720, sets of video fingerprints and sets of audio fingerprints can be dynamically and continuously generated (e.g., by a packing component) based on common successive overlapping time windows, wherein a set of video fingerprints and a set of audio fingerprints are associated with each time window.

At 730, a set of video similarity scores can be determined (e.g., by a video static evaluation component) for respective sets of video fingerprints among the sets of video fingerprints. Concurrently, at 732, a set of audio similarity scores can be determined (e.g., by an audio static evaluation component) for respective sets of audio fingerprints among the sets of audio fingerprints.

At 740, valid video fingerprints among the sets of video fingerprints and valid audio fingerprints among the sets of audio fingerprints can be dynamically determined (e.g., by a validation component) based on the sets of video similarity scores and the sets of audio similarity scores. At 742, valid video fingerprints and valid audio fingerprints can be dynamically added (e.g., by an indexing component) to a fingerprint index.

As used in this application, the term "continuously" or the like is generally intended to refer to repeated action uninterrupted in time or sequence. Furthermore the term "dynamically" or the like is generally intended to refer to action characterized by continuous change, activity, or progress. Thus, performing an action "dynamically and continuously" is generally intended to refer to repeated action uninterrupted in time or sequence through conditions characterized by continuous change, activity, and/or progress.

As used herein, "video" may refer to visual content alone, or both audio and visual content, as will be understood based on context. Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 8:
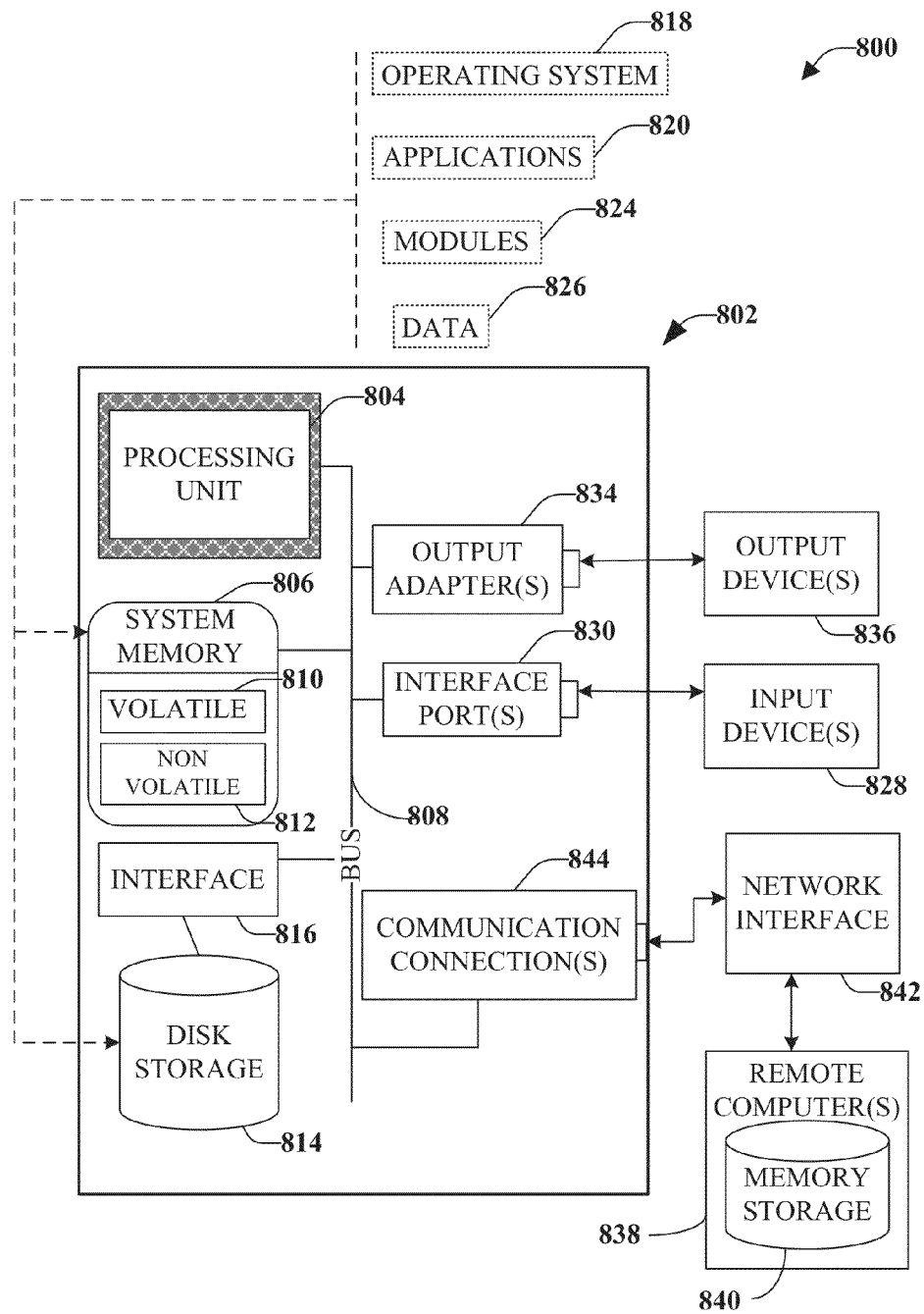
FIG. 8 illustrates an example block diagram of a computer operable to execute the disclosed architecture in accordance with implementations of this disclosure.

With reference to FIG. 8, a suitable environment 800 for implementing various aspects of the claimed subject matter includes a computer 802. It is to be appreciated that the computer 802 can be used in connection with implementing one or more of the systems or components shown and described in connection with FIGS. 1-6. The computer 802 includes a processing unit 804, a system memory 806, and a system bus 808. The system bus 808 couples system components including, but not limited to, the system memory 806 to the processing unit 804. The processing unit 804 can be any of various available processors. Dual microprocessors and other multiprocessor architectures also can be employed as the processing unit 804.

The system bus 808 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 806 includes volatile memory 810 and non-volatile memory 812. The basic input/output system (BIOS), containing the basic routines to transfer information between elements within the computer 802, such as during start-up, is stored in non-volatile memory 812. By way of illustration, and not limitation, non-volatile memory 812 can include read only memory (ROM), programmable ROM (PROM), electrically programmable ROM (EPROM), electrically erasable programmable ROM (EEPROM), or flash memory. Volatile memory 810 includes random access memory (RAM), which acts as external cache memory. According to present aspects, the volatile memory may store the write operation retry logic (not shown in FIG. 8) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 802 may also include removable/non-removable, volatile/non-volatile computer storage media. FIG. 8 illustrates, for example, a disk storage 814. Disk storage 814 includes, but is not limited to, devices like a magnetic disk drive, solid state disk (SSD) floppy disk drive, tape drive, Jaz drive, Zip drive, LS-100 drive, flash memory card, or memory stick. In addition, disk storage 814 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 814 to the system bus 808, a removable or non-removable interface is typically used, such as interface 816.

It is to be appreciated that FIG. 8 describes software that acts as an intermediary between users and the basic computer resources described in the suitable operating environment 800. Such software includes an operating system 818. Operating system 818, which can be stored on disk storage 814, acts to control and allocate resources of the computer system 802. Applications 820 take advantage of the management of resources by operating system 818 through program modules 824, and program data 826, such as the boot/shutdown transaction table and the like, stored either in system memory 806 or on disk storage 814. It is to be appreciated that the claimed subject matter can be implemented with various operating systems or combinations of operating systems.

A user enters commands or information into the computer 802 through input device(s) 828. Input devices 828 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 804 through the system bus 808 via interface port(s) 830. Interface port(s) 830 include, for example, a serial port, a parallel port, a game port, and a universal serial bus (USB). Output device(s) 836 use some of the same type of ports as input device(s) 828. Thus, for example, a USB port may be used to provide input to computer 802, and to output information from computer 802 to an output device 836. Output adapter 834 is provided to illustrate that there are some output devices 836 like monitors, speakers, and printers, among other output devices 836, which require special adapters. The output adapters 834 include, by way of illustration and not limitation, video and sound cards that provide a means of connection between the output device 836 and the system bus 808. It should be noted that other devices and/or systems of devices provide both input and output capabilities such as remote computer(s) 838.

Computer 802 can operate in a networked environment using logical connections to one or more remote computers, such as remote computer(s) 838. The remote computer(s) 838 can be a personal computer, a server, a router, a network PC, a workstation, a microprocessor based appliance, a peer device, a smart phone, a tablet, or other network node, and typically includes many of the elements described relative to computer 802. For purposes of brevity, only a memory storage device 840 is illustrated with remote computer(s) 838. Remote computer(s) 838 is logically connected to computer 802 through a network interface 842 and then connected via communication connection(s) 844. Network interface 842 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 844 refers to the hardware/software employed to connect the network interface 842 to the bus 808. While communication connection 844 is shown for illustrative clarity inside computer 802, it can also be external to computer 802. The hardware/software necessary for connection to the network interface 842 includes, for exemplary purposes only, internal and external technologies such as, modems including regular telephone grade modems, cable modems and DSL modems, ISDN adapters, and wired and wireless Ethernet cards, hubs, and routers.

Figure 9:
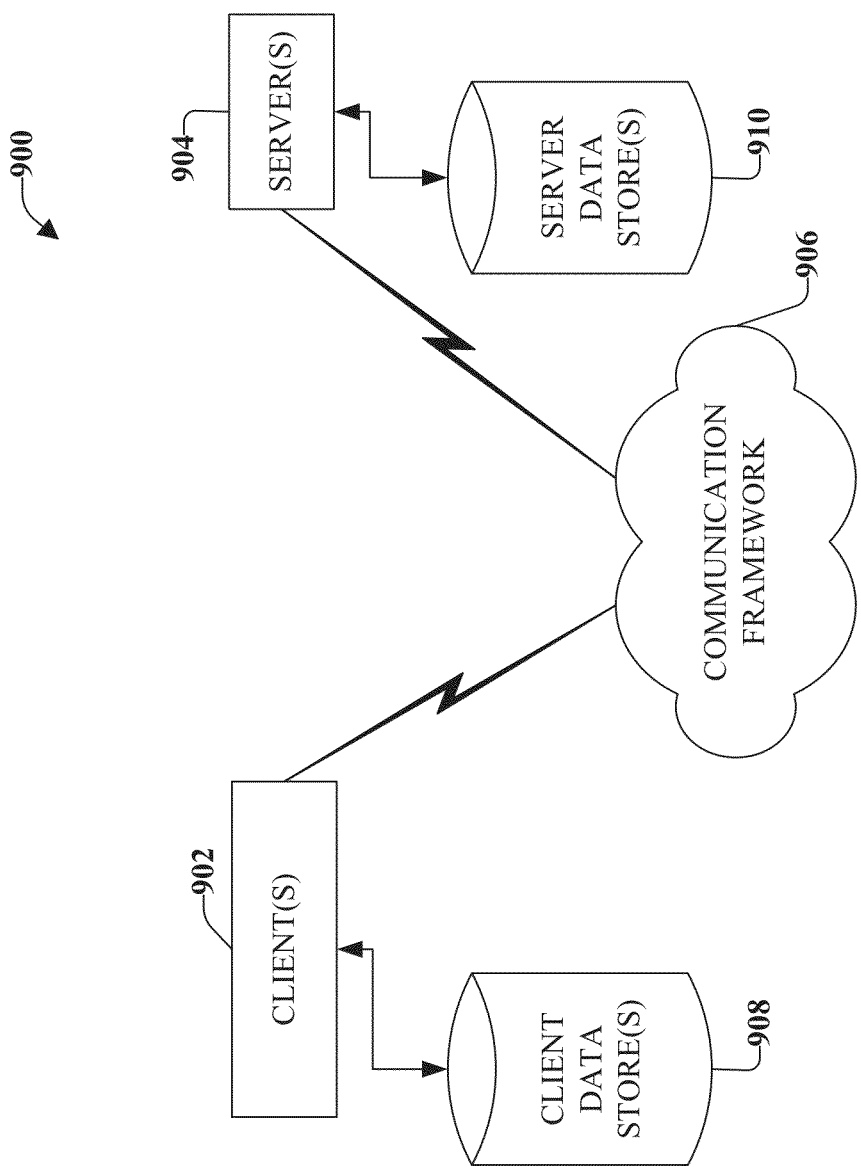
FIG. 9 illustrates an example schematic block diagram for a computing environment in accordance with implementations of this disclosure.

Referring now to FIG. 9, there is illustrated a schematic block diagram of a computing environment 900 in accordance with the subject specification. The system 900 includes one or more client(s) 902, which can include an application or a system that accesses a service on the server 904. The client(s) 902 can be hardware and/or software (e.g., threads, processes, computing devices). The client(s) 902 can house cookie(s), metadata, and/or associated contextual information by employing the specification, for example.

The system 900 also includes one or more server(s) 904. The server(s) 904 can also be hardware or hardware in combination with software (e.g., threads, processes, computing devices). The servers 904 can house threads to perform, for example, receiving a stream ingestion, generating fingerprints, packing subsets of fingerprints, similarity scoring sets of fingerprints, determining valid fingerprints, adding fingerprints to a fingerprint index, etc. in accordance with the subject disclosure. One possible communication between a client 902 and a server 904 can be in the form of a data packet adapted to be transmitted between two or more computer processes where the data packet contains, for example, portions of a video stream. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system comprising:
a memory that has stored thereon computer executable components; and
a processor that executes the following computer executable components stored in the memory:
a receiving component that receives a stream ingestion of a live event;
a video fingerprint component that dynamically and continuously generates video fingerprints of the stream ingestion based on a video sample period;
an audio fingerprint component that dynamically and continuously generates audio fingerprints of the stream ingestion based on an audio sample period;
a packing component that dynamically and continuously generates sets of video fingerprints and sets of audio fingerprints based on common successive overlapping time windows, wherein a set of video fingerprints and a set of audio fingerprints are associated with each time window;
a video static evaluation component that determines a set of video similarity scores for respective sets of video fingerprints among the sets of video fingerprints; and
an audio static evaluation component that determines a set of audio similarity scores for respective sets of audio fingerprints among the sets of audio fingerprints; and
a validation component configured to dynamically invalidate video fingerprints among the set of video fingerprints and audio fingerprints among the set of audio fingerprints for respective time windows based on at least one of the set of video similarity scores associated with the set of video fingerprints or the set of audio similarity scores associated with the set of audio fingerprints.

2. The system of claim 1, wherein the video sample period and the audio sample period are not equal.

3. The system of claim 1, wherein successive overlapping time windows are the same length.

4. The system of claim 1, wherein the video static evaluation component determines the set of video similarity scores further based on a preceding set of video similarity scores.

5. The system of claim 1, wherein the audio static evaluation component determines the set of audio similarity scores further based on a preceding set of audio similarity scores.

6. The system of claim 1, wherein the video static evaluation component determines the set of video similarity scores further based on Hamming similarities.

7. The system of claim 1, wherein the audio static evaluation component determines the set of audio similarity scores further based on at least one of Hamming similarities or a detection of silence.

8. The system of claim 1, further comprising:
a validation component that dynamically determines valid video fingerprints among the sets of video fingerprints and valid audio fingerprints among the sets of audio fingerprints based on at least one of the sets of video similarity scores or the sets of audio similarity scores.

9. The system of claim 8, further comprising:
an indexing component that at adds the valid video fingerprints among the sets of video fingerprints and the valid audio fingerprints among the sets of audio fingerprints to a fingerprint index.

10. A method comprising:
receiving, by a system including a processor, a stream ingestion of a live event;
dynamically and continuously generating, by the system, video fingerprints of the stream ingestion based on a video sample period;
dynamically and continuously generating, by the system, audio fingerprints of the stream ingestion based on an audio sample period;
dynamically and continuously generating, by the system, sets of video fingerprints and sets of audio fingerprints based on common successive overlapping time windows, wherein a set of video fingerprints and a set of audio fingerprints are associated with each time window;
determining, by the system, a set of video similarity scores for respective sets of video fingerprints among the sets of video fingerprints;
determining, by the system, a set of audio similarity scores for respective sets of audio fingerprints among the sets of audio fingerprints; and
dynamically, by the system, invalidating one or more video fingerprints among the set of video fingerprints and one or more audio fingerprints among the set of audio fingerprints for respective time windows based on at least one of the set of video similarity scores associated with the set of video fingerprints or the set of audio similarity scores associated with the set of audio fingerprints.

11. The method of claim 10, wherein the video sample period and the audio sample period are not equal.

12. The method of claim 10, wherein successive overlapping time windows are the same length.

13. The method of claim 10, wherein the determining the set of video similarity scores is further based on a preceding set of video similarity scores.

14. The method of claim 10, wherein the determining the set of audio similarity scores is further based on a preceding set of audio similarity scores.

15. The method of claim 10, wherein the determining the set of video similarity scores is further based on Hamming similarities.

16. The method of claim 10, wherein the determining the set of audio similarity scores is further based on at least one of Hamming similarities or a detection of silence.

17. The method of claim 10, further comprising:
dynamically, by the system, removing invalid video fingerprints and invalid audio fingerprints from a fingerprint index.

18. A non-transitory computer-readable medium comprising computer-executable instructions that, in response to execution, cause a system including a processor to perform operations, comprising:
receiving a stream ingestion of a live event;
dynamically and continuously generating video fingerprints of the stream ingestion based on a video sample period;

dynamically and continuously generating audio fingerprints of the stream ingestion based on an audio sample period;

dynamically and continuously generating sets of video fingerprints and sets of audio fingerprints based on common successive overlapping time windows, wherein a set of video fingerprints and a set of audio fingerprints are associated with each time window;

determining a set of video similarity scores for respective sets of video fingerprints;

determining a set of audio similarity scores for respective sets of audio fingerprints; and dynamically invalidating one or more video fingerprints among the set of video fingerprints and one or more audio fingerprints among the set of audio fingerprints for respective time windows based on at least one of the set of video similarity scores associated with the set of video fingerprints or the set of audio similarity scores associated with the set of audio fingerprints.

19. The computer readable storage medium of claim 18, further comprising:

dynamically removing invalid video fingerprints and invalid audio fingerprints from a fingerprint index.

\* \* \* \* \*